United States Patent
Gunnarsson et al.

(10) Patent No.: US 9,743,306 B2
(45) Date of Patent: Aug. 22, 2017

(54) METHOD AND ARRANGEMENT FOR TERMINAL REPORTING

(75) Inventors: Fredrik Gunnarsson, Linköping (SE); Gunnar Heikkilä, Gammelstad (SE); David Lindegren, Luleå (SE); Johan Moe, Mantorp (SE); Andras Valkó, Hässelby (SE); András Veres, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 232 days.

(21) Appl. No.: 14/351,417

(22) PCT Filed: Oct. 12, 2011

(86) PCT No.: PCT/SE2011/051219
§ 371 (c)(1),
(2), (4) Date: May 27, 2014

(87) PCT Pub. No.: WO2013/055266
PCT Pub. Date: Apr. 18, 2013

(65) Prior Publication Data
US 2014/0295864 A1    Oct. 2, 2014

(51) Int. Cl.
*H04W 24/10* (2009.01)
*H04L 29/12* (2006.01)
(Continued)

(52) U.S. Cl.
CPC ......... *H04W 24/10* (2013.01); *H04L 41/5032* (2013.01); *H04L 61/1511* (2013.01);
(Continued)

(58) Field of Classification Search
CPC ........... H04L 29/12905; H04L 41/5032; H04L 61/6054; H04L 65/1069; H04L 61/1511;
(Continued)

(56) References Cited

U.S. PATENT DOCUMENTS 6,446,028 B1     9/2002 Wang
2002/0198985 A1  12/2002 Fraenkel et al.
(Continued)

FOREIGN PATENT DOCUMENTS

EP    1927913 B1    11/2011
GB    2421149 A     6/2006

OTHER PUBLICATIONS

Author Unknown, "3rd Generation Partnership Project; Technical Specification Group Core Network and Terminals; Characteristics of the Universal Subscriber Identity Module (USIM) application (Release 10)," Technical Specification 31.102, Version 10.1.0, Apr. 2011, 3GPP Organizational Partners, 227 pages.
(Continued)

*Primary Examiner* — Nam Huynh
(74) *Attorney, Agent, or Firm* — Patent Portfolio Builders, PLLC

(57) ABSTRACT

The invention relates to a method for performance reporting in a wireless network, wherein at least one terminal is associated to a terminal report server by means of information in the terminal. Prior to initiating the performance report, information on operator identity is retrieved. The operator identity is combined with information identifying the associated terminal report server to compile a fully qualified domain name. Connectivity information to the terminal server report is requested and received from a domain name server, whereupon a performance report session to the terminal report server is initiated using the received connectivity information. The invention also relates to a terminal wherein the inventive method is applied.

12 Claims, 3 Drawing Sheets

(51) Int. Cl.
  *H04W 76/02* (2009.01)
  *H04L 29/06* (2006.01)
  *H04L 12/24* (2006.01)
(52) U.S. Cl.
  CPC ........ *H04L 61/303* (2013.01); *H04L 65/1069* (2013.01); *H04W 76/02* (2013.01)
(58) Field of Classification Search
  CPC .... H04L 61/303; H04W 24/02; H04W 24/10; H04W 8/26; H04W 76/02
  See application file for complete search history.

(56) References Cited

U.S. PATENT DOCUMENTS

| | | | | |
|---|---|---|---|---|
| 2009/0156253 | A1* | 6/2009 | Shi | H04L 29/1216 455/558 |
| 2009/0310532 | A1* | 12/2009 | Neil | H04J 11/0093 370/328 |
| 2011/0212725 | A1 | 9/2011 | Vikberg et al. | |
| 2012/0207104 | A1* | 8/2012 | Liang | H04W 48/20 370/329 |

OTHER PUBLICATIONS

Author Unknown, "Technical Specification Group Core Network and Terminals; Numbering, addressing, and identification (Release 9)," Technical Specification 23.003, Version 9.4.0, 3GPP Organizational Partners, Sep. 2010, 76 pages.

Author Unknown, "Technical Specification Group Services and System Aspects; Multimedia Broadcast/Multicast Service (MBMS); Protocols and codecs (Release 10)," Technical Specification 26.346, Version 10.0.0, 3GPP Organizational Partners, Mar. 2011, 150 pages.

Author Unknown, "Technical Specification Group Core Network and Terminals; Domain Name System Procedures; Stage 3 (Release 9)," Technical Specification 29.303, Version 9.2.0, 3GPP Organizational Partners, Sep. 2010, 51 pages.

International Search Report for PCT/SE2011/051219 mailed Jul. 2, 2012, 3 pages.

Huawei "Discussion on IMS based MBMS download service," TSG-SA4#53 meeting, S4-090207, San Diego, USA, XP050347880, Apr. 13-17, 2009, p. 1.

Samsung "Non-optimized handover between 3GPP and non-3GPP access for emergency attached UEs" 3GPP TSG SA WG2 Meeting #72, 82-092057, Hangzhou, XP050629649, Apr. 2009, pp. 3.

* cited by examiner

US 9,743,306 B2

METHOD AND ARRANGEMENT FOR TERMINAL REPORTING

This application is a 35 U.S.C. §371 national phase filing of International Application No. PCT/SE2011/051219, filed Oct. 12, 2011, the disclosure of which is incorporated herein by reference in its entirety.

TECHNICAL FIELD

The present invention relates to terminal performance reporting for a service received over a wireless link.

BACKGROUND OF THE INVENTION

In a wireless network, such as a LTE network or a WCDMA network, it is important to ensure good quality for the data traffic in the network. Quality can be verified and efficiently maintained by monitoring the functionalities of the wireless network with appropriate apparatus and procedures. The monitoring of the network reveals whether desired connection or services are available or whether a sufficient quality level for the connection is reached.

The performance of a service provided over a wireless link depends on numerous factors. Some of these can be determined via standardized radio link measurements. Others can be related to other known or discloseable factors. However, some factors are advantageously reported by the terminal application or related procedures in the terminal. Perceived service quality can be facilitated by service evaluations in the terminal that is fed back to the service provider. Another option is application layer terminal reporting, typically to the service provider. Such reporting is based on the information available to an application on a mobile terminal, and is conveyed to the service provider as part of the service session communication and signalling.

Performance reports directly from the terminal or user equipment (UE) provide valuable information about the performance for terminals and applications run on the terminals. A terminal report may be sent to terminal report server in the core network of the wireless network. Such reporting requires information of the destination for the terminal performance reports.

A fully qualified domain name (FQDN) is the complete domain name of a specific computer or host on a routed network such as the Internet. A fully qualified domain name, is a domain name that specifies its exact location in the tree hierarchy of the Domain Name System (DNS). It specifies all domain levels, including the top-level domain and the root domain. The fully qualified domain name is distinguished by its uniqueness; it can only be interpreted one way.

A domain name server can look up the IP address of the host using the fully qualified domain name (FQDN) as the key. This is also used to specify complete domain names of specific hosts in the network of the operator, such as a terminal report server in a core node of a wireless network. The nomenclature for compiling domain names is described in 3GPP TS 23.003 V9.4.0 "Numbering, addressing and identification" and 3GPP TS 29.303 V9.2.0 "Domain Name System Procedures" provides details about the DNS operations.

A method for terminal reporting relating to Quality of Experience is suggested in 3GPP TS26.346 V10.0.0 "Multimedia Broadcast/Multicast Service (MBMS); Protocols and codecs", wherein the reporting is made to a Broadcast Multicast Service Center (BM-SC) located in the core network. The reporting is performed from a terminal to a service provider involving communication over an access network node and a core network node. The reporting does not support application layer terminal reporting, due to a lack of knowledge in the terminal relating to proper IP addressing of the terminal reports. Furthermore, feedback is provided to the service provider, i.e., reaching a node in the serving operator network, and may not reach the terminal's operator network.

Another method for performance reporting is based on the presence of spy-ware applications in the terminal, whereby service performance for a specific application may be observed. The observations may be offered to application providers or operators on commercial terms. However, these types of applications are usually limited to specific applications. The introduction of spy-ware in the terminal could also raise questions of terminal user integrity.

SUMMARY

It is the object of the invention to provide an improved method for performance reporting, wherein the reporting may cover perception of any service received by in the terminal and where the reports may be addressable to a terminal report server gathering reports on perceived performance of a service.

This object is achieved through the inventive method, wherein there is an association to at least one terminal report server by means of information in the terminal. The operator identity for the terminal is retrieved. Information identifying the associated terminal report is retrieved and combined with the operator identity to compile a fully qualified domain name. This fully qualified domain name is communicated to a domain name server (DNS), which translates the fully qualified domain name to unique connectivity information. Information on the unique connectivity information is received, whereupon a terminal report session to the terminal report server is initiated.

It is another object of the invention to provide an improved terminal enabling performance reporting according to the improved method.

This object is achieved through an inventive terminal in a wireless network comprising at least one application layer performance indicator arranged to generate a performance indicator for the performance of a service provided to the terminal over a wireless link. The terminal includes an application arranged to determine a fully qualified domain name based on information in a subscriber identity module and a terminal server association stored in the terminal and to send a request for a terminal server IP address based on the fully qualified domain name. The terminal further include means to compile a terminal server report based on performance indicators from the at least one application layer performance indicator and means to initiate a terminal server report session. An RF transceiver in the terminal is arranged to transmit the terminal server report.

The inventive method and terminal provides an advantageous application for service performance reporting allowing increased knowledge for the operators on actual service performance whilst reducing the need for independent applications for evaluating service performance, e.g., spyware applications provided by third party.

DETAILED DESCRIPTION

Figure 1:
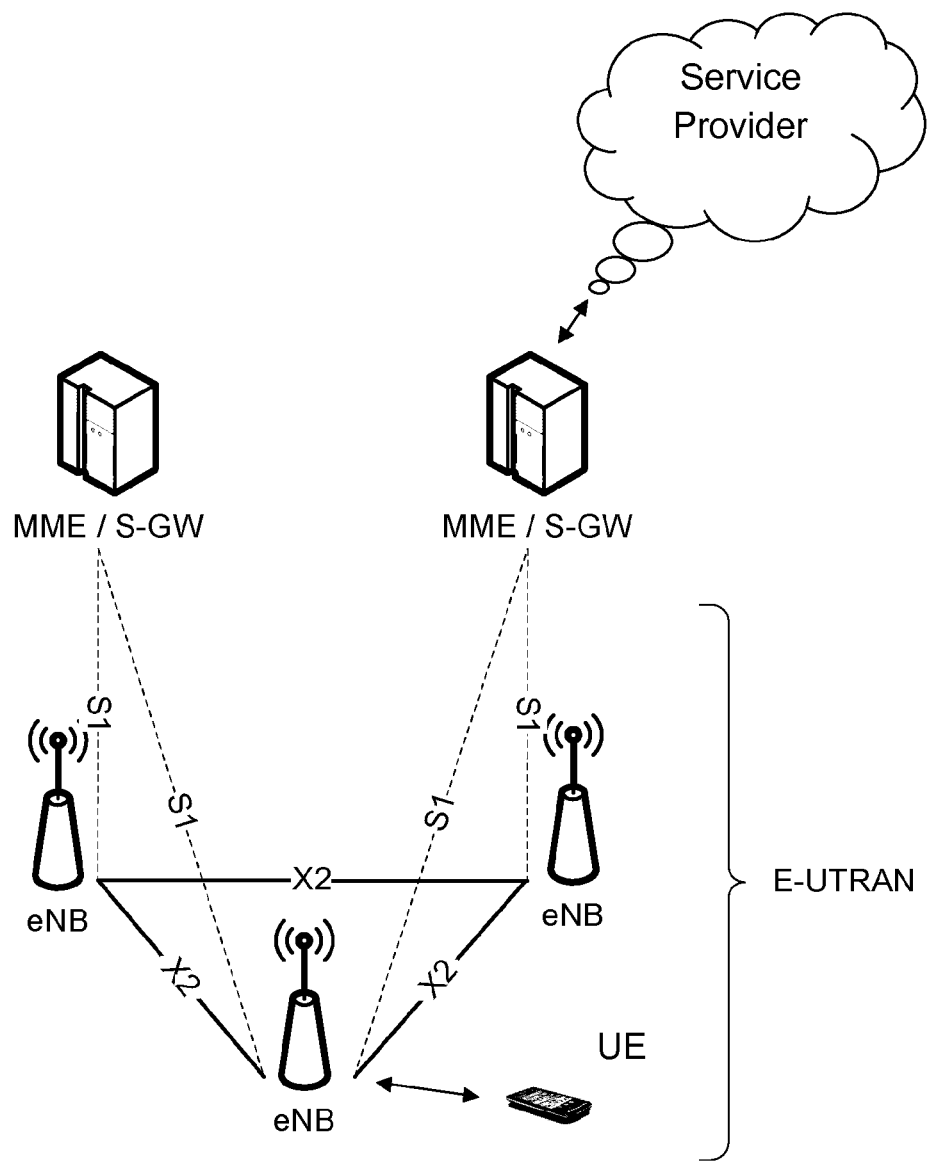
FIG. 1 is an exemplifying wireless network architecture based on 3GPP LTE

FIG. 1 discloses exemplifying wireless network architecture based on 3GPP LTE wherein mobile terminals UE receive varying types of service deliveries for which the future performance would benefit from reporting of terminal service evaluations.

Figure 2:
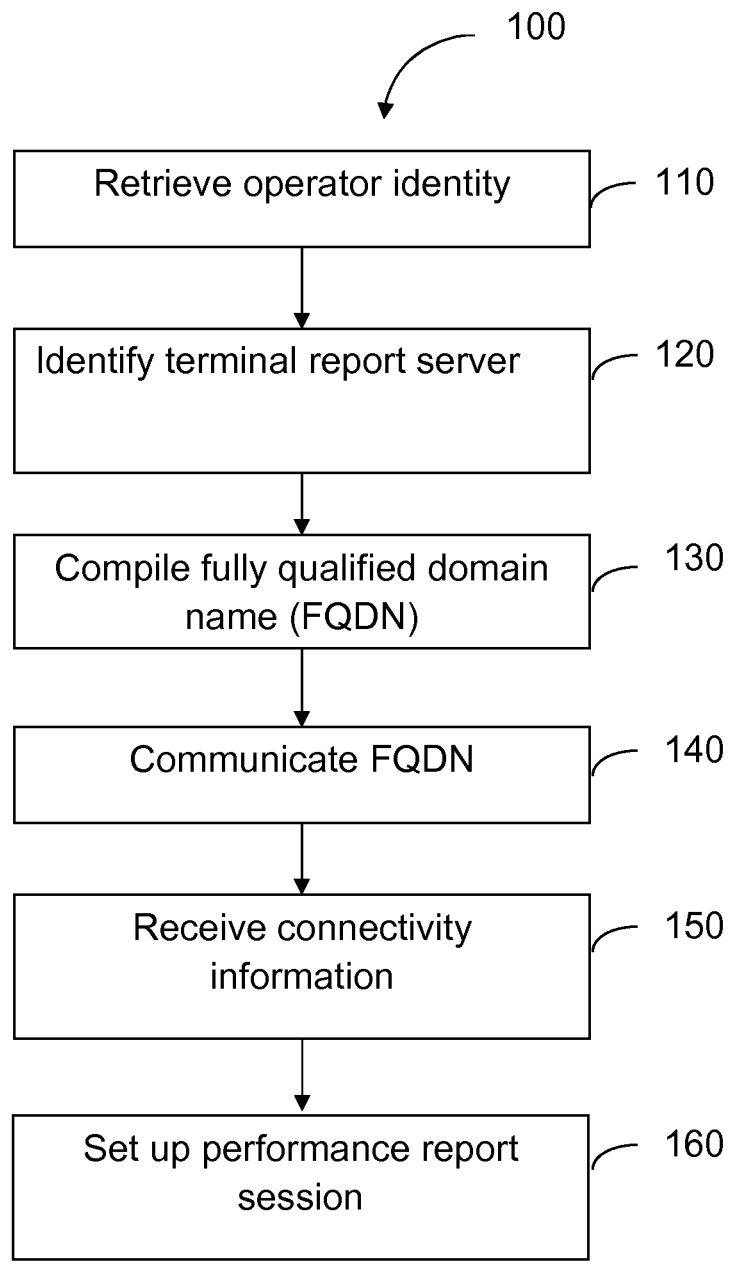
FIG. 2 is a flowchart illustrating method steps according to the present invention

In FIG. 2 a flow chart discloses a method for performance reporting in a wireless network according to an embodiment of the invention.

In a first step 110, the Mobile Country Code (MCC), which identifies uniquely the country of domicile of the mobile subscriber and the Mobile Network Code (MNC) identifying the operator within the country, are recovered. Together they form the operator identity.

In some cases, an operator is managing his cellular network, and is providing service to its subscribers. The subscriber identity module (SIM) in the mobile terminal lists the operator identity of the operator it belongs to. Such operator identity information is part of the International Mobile Subscriber Identity (IMSI). This operator identity is also broadcasted by the base stations of the operator network. This is the most common case. However, it is also possible that the mobile terminal is roaming to a different country or region. In that case, it might obtain service from a different operator with which the mobile terminal operator has agreements. Such information may be listed on the SIM. Another alternative is that the operator markets its services under several brands. This means one infrastructure operator and one or several virtual operators. Each of these operators will have their own operator identity, and the list of valid operator identities are broadcasted in the network. The SIM includes information on the operator (infrastructure or virtual) responsible for the subscription.

The International Mobile Subscriber Identity (IMSI) may be used to recover MNC and MCC. For 3GPP systems, the terminal derives the home network domain name from the IMSI according to the following steps:

1. Take the first 5 or 6 digits, depending on whether a 2 or 3 digit MNC is used (see 3GPP TS 31.102) and separate them into MCC and MNC; if the MNC is 2 digits then a zero shall be added at the beginning.
2. Use the MCC and MNC derived in step 1 to create the "mnc<MNC>.mcc<MCC>.3gppnetwork.org" domain name.
3. Add the label "ims." to the beginning of the domain.
   An example of a home network domain name is:
   IMSI in use: 234150999999999;
   where:
   MCC=234;
   MNC=15; and
   MSIN=0999999999,
   which gives the home network domain name:
   ims.mnc015.mcc234.3gppnetwork.org.

When roaming, the retrieved operator identity is the home operator of the terminal.

Another option for determining operator identity is to use serving cell system information to recover MNC and MCC. The MNC and MCC point at the local operator when roaming or the infrastructure operator when using a virtual operator.

Serving cell system information may also be used to recover a list of MNC and MCC. The selection may then be based on what is also listed on the IMSI. This could mean selecting the MNC and MCC of the virtual operator. The selection may also be based on the first operator identity in the list, or any other selection that leads to the MNC and MCC of the infrastructure operator.

In a subsequent step 120, information relating to a terminal report server is retrieved. The information may be pre-configured in the terminal, introduced in the terminal when setting up a subscription with an operator, downloading a specific application to the terminal or received when entering a local operator when roaming. The information is stored as a terminal report server string tsr.

The terminal report server string tsr is combined with the operator identity to compile a fully qualified domain name in a step 130, e.g,
trss.mnc015.mcc234.3gppnetwork.org In a following step 140 the fully qualified domain name is sent to a domain name server DNS or any other entity in the network of the operator that may proved connectivity information, such as an IP-address, of the terminal report server.

In another step 150, the domain name server DNS, or any other entity having connectivity information for a terminal report server, responds with connectivity information. In an embodiment of the invention, the connectivity information is an IP address to the terminal report server.

In a concluding step 160, a terminal report session is initiated to the terminal report server by means of the received connectivity information.

In an alternative embodiment of the invention, the network includes more than one terminal report servers. In this case, the step of compiling a fully qualified domain name may also include at least parts of a tracking area identity.

The tracking area identity TAI consists of a tracking area code TAO, the MNC and the MCC. The TAC is a 16 bit integer. <TAC-high-byte> is the hexadecimal string of the most significant byte in the TAO and <TAC-low-byte > is the hexadecimal string of the least significant byte. If there are less than 2 significant digits in <TAC-high-byte> or <TAC-low-byte>, "0" digit(s) shall be inserted at the left side to fill the 2 digit coding, The TAI FQDN is compiled as:

tac-lb<TAC-low-byte>.tac-hb<TAC-high-byte>.trs.mnc<MNC>.mcc<MCC>.3gppnetwork.org
or
tac-hb<TAC-high-byte>.trs.mnc<MNC>.mcc<MCC>.3gppnetwork.org
or
tac-lb<TAC-low-byte>.trs.mnc<MNC>.mcc<MCC>.3gppnetwork.org Another way to handle multiple terminal report servers is to group them into pools, where each server is identified by a groupID (TRSGI) and a server code (TRSC) within the group. The TRS node FQDN can thus be constructed as:
trsc<TRSC>.trsg<TRSGI>.trs.mnc<MNC>.mcc<MCC>.3gppnetwork.org A TRS pool FWDN can be constructed as:
trsgi<TRSGI>.trs.mnc<MNC>.mcc<MCC>.3gppnetwork.org Regardless of the type compilation of a fully qualified domain name performed in a terminal, the compiled FQDN is sent to a domain name server DNS in the network of the operator to acquire connectivity information for the terminal report server. The DNS responds with such connectivity information. In an embodiment of the invention, one or several IP addresses are expected to represent the connectivity information. These IP addresses are used by the mobile terminal application to initiate a report session to one or more terminal report servers.

Figure 3:
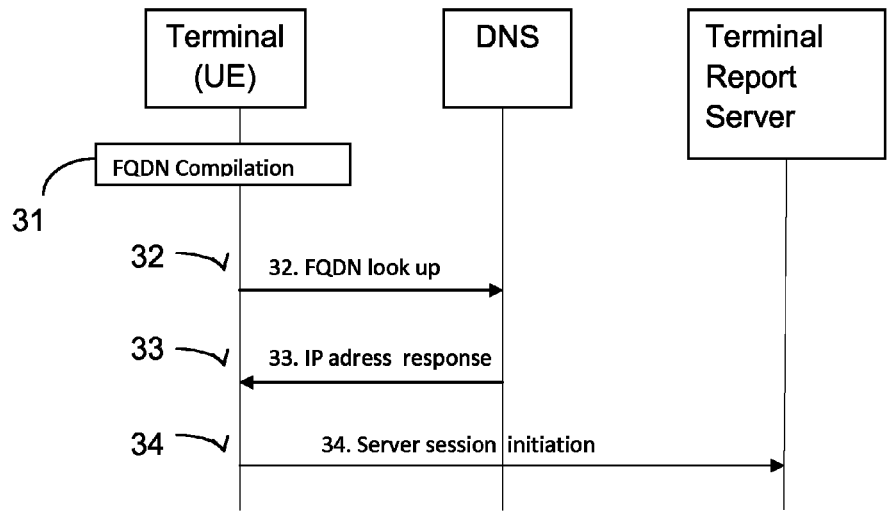
FIG. 3 is a signalling diagram for method steps according to FIG. 2

FIG. 3 discloses a signaling diagram for an embodiment of invention. A fully qualified domain name FQDN is compiled 31 in the terminal UE. A FQDN signal 32 is initiated to a domain name server DNS for identifying proper connectivity information based on the information present in the fully qualified domain name. The identification of connectivity information in the DNS is performed in a conventional way. The DNS responds including the connectivity information, e.g., an IP address, in an IP address response 33 to the terminal. The terminal receives the connectivity information and sends a server session initiation signal 34 to the terminal report server. The signaling is addressed to a terminal report server, which may be part of service provider core network with a logical interface to a terminal access network. Following the initiation, service performance reports are transmitted to terminal report server.

Figure 4:
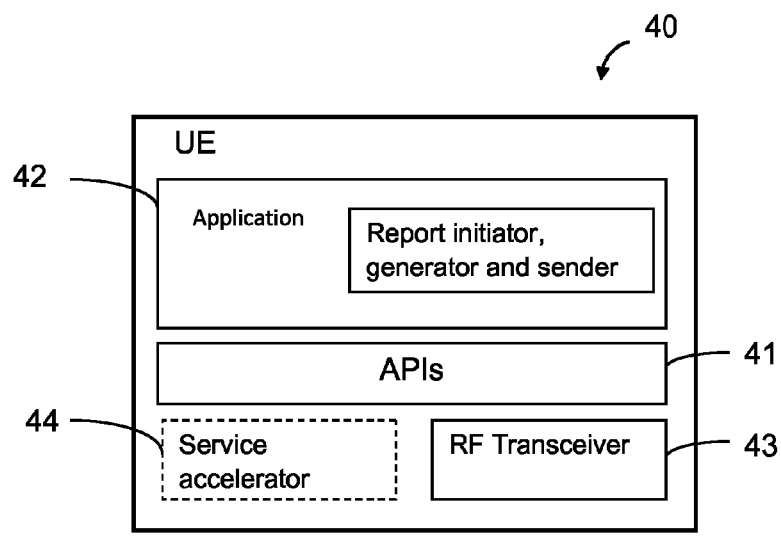
FIG. 4 is a block diagram of a terminal architecture

FIG. 4 discloses a block diagram of an exemplifying terminal/UE architecture. The terminal 40 includes hardware and software components. An application 42 with reporting facilitators interacts with the terminal hardware and software components through an application layer performance indicator API 41. The application layer performance indicator 41 is arranged to generate a performance indicator for the performance of a service provided to the terminal 40 over a wireless link. The performance indicator may include service specific parameters and performance indicators. The reporting facilitators in said application include an arrangement for determining a fully qualified domain name based on information in a subscriber identity module and a terminal server association stored in the terminal. The terminal server association may be a text string or any other type of suitable association. The reporting facilitators further include means to receive connectivity information to a terminal server, e.g., an IP address, following communication of the fully qualified domain name to a domain name server, and means to compile a terminal server report based on performance indicators from the at least one application layer performance indicator. The information is sent to the terminal report server by means of the connectivity information. Transmission of the terminal server report is effected by an RF transceiver 43 in the terminal.

FIG. 4 discloses an exemplifying terminal architecture. A terminal 40 includes an application 42 with reporting facilitators. The application 42 interacts via APIs 41 with the terminal hardware and software.

The terminal may also include a service accelerator 44 dedicated to implementing a specific service. The service accelerator 44 is arranged to process data associated with the specific service and thereby contributing to the service realization in the terminal. Performance reporting relating to services supported by service accelerators relies on the ability retrieve information from the service accelerator to the application wherein the performance report is generated.

Performance reporting in accordance with the invention may be implemented in an application in the terminal or in the operating system of the terminal, e.g., the Android operating system or the iOS operating system.

The content of the terminal server report may include multimedia/video/audio decoding performance details, typically related to the codec used. The report may also include any or all of the following:

end to end latency information on application level,
audiovisual decoding performance details, typically related to encoding parameters and packet losses due to late arrival,
voice decoding performance details, with or without video,
estimated quality scores (MOS etc) for integrity aspects of the services monitored,
gaming experience details,
remote desktop performance.

An advantageous implication of the inventive method and terminal is that a general application for service realization can be developed. The terminal performance reports end up at the terminal report server in the network of the serving operator, the network of the home operator, a combination of the two or any other performance reporting stakeholders determined mapping a fully qualified domain name to connectivity information in the domain name server.

With performance reporting according to the invention, the operator will have increased ability to access performance reports relating to the applications layer in the terminal.

The invention claimed is:

1. Method for performance reporting in a wireless network wherein at least one terminal is associated to a terminal report server by means of information in the at least one terminal including the steps of:
    retrieving an operator identity;
    retrieving information identifying the associated terminal report server;
    retrieving a tracking area identity of the associated terminal report server;
    combining the operator identity, the retrieved information identifying the associated terminal report server, and the tracking area identity to compile a fully qualified domain name;
    communicating the fully qualified domain name to a domain name server;
    receiving connectivity information for the associated terminal report server, from the domain name server, wherein the connectivity information is based on the fully qualified domain name; and
    setting up a performance reporting session for sending performance reports to the associated terminal report server by connecting to the associated terminal report server using the received connectivity information, wherein the performance reporting relates to performance of an application on the at least one terminal.

2. Method according to claim 1, wherein the connectivity information is an IP address.

3. Method according to claim 1, wherein the steps are carried out in the at least one terminal.

4. Method according to claim 1, wherein the information identifying the associated terminal report server is a text string.

5. Method according to claim 1, wherein the associated terminal report server is part of a service provider core network with a logical interface to a terminal access network.

6. Method according to claim 1, wherein the operator identity is recovered from subscriber identity information in the at least one terminal.

7. Method according to claim 1, wherein the operator identity is determined from broadcasted information from a serving base station.

8. Method according to claim 6, wherein the method further comprises excluding operator identities not listed in the subscriber identity information.

9. Method according to claim 6, wherein the subscriber identity information comprises an International Mobile Subscriber Identity (IMSI) containing the operator identity in terms of Mobile Country Code (MCC), which identifies uniquely a country of domicile of a mobile subscriber and Mobile Network Code (MNC), which identifies the operator within the country.

10. Method according to claim 7, wherein the broadcasted information comprises at least one list of allowed operator identities.

11. Method according to claim 1, wherein the at least one terminal is associated to multiple terminal report servers and whereby the step of retrieving information identifying the associated terminal report server is performed for each associated terminal report server, whereupon a fully qualified domain name is compiled for each associated terminal report server, connectivity information is established for each associated terminal report server, and a performance reporting is initiated to each associated terminal report server by connecting to each associated terminal report server using the connectivity information established for each associated terminal report server.

12. Method for performance reporting in a wireless network wherein at least one terminal is associated to a terminal report server by means of information in the at least one terminal including the steps of:

retrieving an operator identity;

retrieving information identifying the associated terminal report server;

retrieving a groupID and a server code of the associated terminal report server;

combining the operator identity, the retrieved information identifying the associated terminal report server, and the groupID and the server code to compile a fully qualified domain name;

communicating the fully qualified domain name to a domain name server;

receiving connectivity information for the associated terminal report server, from the domain name server, wherein the connectivity information is based on the fully qualified domain name; and setting up a performance reporting session for sending performance reports to the associated terminal report server by connecting to the associated terminal report server using the received connectivity information, wherein the performance reporting relates to performance of an application on the at least one terminal.

* * * * *